United States Patent [19]
Wetzels et al.

[11] 3,943,743
[45] Mar. 16, 1976

[54] METHOD AND APPARATUS FOR CONTROLLING WITH INCREASED ACCURACY A PROCESSING MACHINE DRIVEN AT VARYING OPERATING SPEEDS, SUCH AS A SLIDE DRAWING MACHINE, ESPECIALLY, AS WELL AS THE SLIDE DRAWING MACHINE PER SE AND AUXILIARY DEVICE

[75] Inventors: Walter Wetzels, Eynatten, Belgium; Johann Greven; Wilhelm Römer, both of Aachen-Schleckheim, Germany; Heinz Hoppe, Aachen, Germany

[73] Assignee: Schumag Schumacher Metallwerke Gesellschaft mit beschrankter Haftung, Aachen, Germany

[22] Filed: Apr. 30, 1974

[21] Appl. No.: 465,620

[30] Foreign Application Priority Data
May 3, 1973   Germany............................. 2322279
Nov. 9, 1973  Germany............................. 2356046
Jan. 28, 1974 Germany............................. 2403872

[52] U.S. Cl.................................... 72/290; 226/164
[51] Int. Cl.²............................................ B21C 1/14
[58] Field of Search...... 72/290, 422; 226/112, 163, 226/164

[56] References Cited
UNITED STATES PATENTS
1,683,906   9/1928   Mahoney............................. 72/290
2,803,456   8/1957   Powers.............................. 226/164
3,844,152  10/1974   Peytavin........................... 72/290

*Primary Examiner*—Milton S. Mehr
*Attorney, Agent, or Firm*—Herbert L. Lerner

[57] ABSTRACT

Method of controlling with heightened accuracy a processing machine driven at different operating speeds and having a machine part moving through a predetermined full range, the processing machine, at an initial setting of the moving machine part, within a given tolerance range, repeatedly permitting start-up of a processing cycle that has been instituted in advance through a precontrolled time period dependent upon the operating speed and which includes a control commencement build-up time period and a full range displacement time period, which includes interposing a blocking time period between the control commencement build-up time period and the full range displacement time period, the blocking time period always ending at the same position in the displacement range of the moving machine part, blocking the full range displacement by the moving machine part until the end of the blocking time period, and advancing the start of the control commencement build-up time period in accordance with the blocking time period; apparatus for performing the foregoing method; a processing machine in the form of a slide drawing machine per se; and auxiliary devices for the slide drawing machine.

14 Claims, 25 Drawing Figures

METHOD AND APPARATUS FOR CONTROLLING WITH INCREASED ACCURACY A PROCESSING MACHINE DRIVEN AT VARYING OPERATING SPEEDS, SUCH AS A SLIDE DRAWING MACHINE, ESPECIALLY, AS WELL AS THE SLIDE DRAWING MACHINE PER SE AND AUXILIARY DEVICE

The invention relates to a method and apparatus for controlling with heightened accuracy a processing machine driven at varying operating speeds, such as a slide drawing machine, especially, as well as the slide drawing machine per se and the auxiliary devices. The processing machine to which reference has been made is quite generally a machine in which a workpiece if advanced at an operating speed that is constant for the particular operation yet can be varied selectively from operation to operation, moreover, a machine part or tool is provided which can be moved toward the workpiece transversely to the operating direction. This tool may be, for example, a saw or shears or, in the case of the slide or carriage drawing machine, the drawing jaws for gripping a strand-shaped elongated workpiece. In the specific case of the slide drawing machine, the invention relates particularly to a continuously operating slide drawing machine having at least two alternating operating slides that are reciprocatingly guided on rails extending parallel to the operating direction of the machine, and that further have associated rotating cam carriers for the slide drive system, openable and closable drawing jaws on each carriage, with a control device for controlled actuation of the drawing jaws each time within an overlap distance or span traversed by a slide during transfer of the workpiece from one slide to the other, and with a phase displacement of the cam profiles or tracks or the cam carriers associated with respective slides, which produces, within the overlap span or distance, the difference in the velocities of the slides that is necessary for the transfer of the workpiece.

In a processing machine according to one of the aforedescribed types, the operation of interest herein is quite generally that, at an initial position of a moving machine part, within a given tolerance range, the machine always permits an operation or processing cycle to start which is initiated in advance through a precontrolled time period dependent upon the operating speed and which includes a control commencement build-up time period and a full range displacement time period. This time period can also be called reaction duration time period.

The initial position is the position wherein, for example, in the case of a saw, the saw first comes into contact with the material to be sawed or, in the case of the slide drawing machine, the drawing jaws of the respective drawing slide have closed, grip the workpiece firmly, and the transmission of the drawing forces from this slide to the workpiece begins. The control commencement build-up time is the time which elapses, for example, in the case of a drawing-jaw control through subjection to a pressure medium, from the instant of starting to the instant of completion of the build-up of the control pressure in a control cylinder having a control piston. The full range displacement time is then the time required for the control piston to complete its operating stroke.

It has been known heretofore to effect the start by means of a trip dog or start-up cam rotating in synchronism with the machine. For different operating speeds, several trip dogs or start-up cams can be provided. The trip dog or start-up cam may also be adjustable. The adjustment can be effected automatically through the interposition of a tachogenerator. A control has also become known heretofore from German Pat. No. 1930700 wherein an adjustment is made automatically and continuously, depending upon the respective operating speed. All of the heretofore known measures based upon this known control have the disadvantage that, for example in the aforedescribed slide drawing machine with the drawing-jaw control through subjection to a pressure medium, that they work with sufficient accuracy only at operating speeds of up to about 60 m/min. At higher operating speeds of up to about 120 m/min., the accuracy is degraded considerably by the spread of the reaction delay time. Particularly the relatively long control commencement build-up time, which may be, for example, about 120 ms (milliseconds), is a source of inaccuracies here. The full range displacement time is usually shorter and is, in general, of the order of about 10 ms.

The overlap time necessary for traversing the overlap distance is also only of the order of about 10 ms for high operating speeds. These inaccuracies, particularly inasmuch as they result from the longer control commencement build-up time, can no longer be tolerated here. The inaccuracies cause a jerky transfer of the workpiece from one slide to the other. This results in the formation of undesirable surface marks on the workpiece and in increased wear of the guiding components of the drawing machine. It must also be taken into consideration, in that regard, that at high operating speeds the slides and the parts mounted thereon are subjected additionally to marked inertial forces when displacement or motion irregularities occur.

It is accordingly an object of the invention to increase the accuracy obtained when working with the heretofore known methods, devices or processing machines, particularly slide drawing machines, so that trouble-free operation is possible also at high operating speeds. In particular, it is an object of the invention to improve, in slide drawing machines, the accuracy in the transfer of the workpiece from one slide to the other and the constancy of the workpiece velocity during the transfer.

With the foregoing and other objects in view, there is provided, in accordance with the invention, a method of controlling with heightened accuracy a processing machine driven at different operating speeds and having a machine part moving through a predetermined full range, the processing machine, at an initial setting of the moving machine part, within a given tolerance range, repeatedly permitting start-up of a processing cycle that has been instituted in advance through a precontrolled time period dependent upon the operating speed and which includes a control commencement build-up time period and a full range displacement time period, which comprises interposing a blocking time period between the control commencement build-up time period and the full range displacement time period, the blocking time period always ending at the same position in the displacement range of the moving machine part, blocking the full range displacement by the moving machine part until the end of the blocking time period, and advancing the start of the control commencement build-up time period in accordance with the blocking time period.

Due to the fact that the blocking interval ends each time in the same position within the displacement range of the moving machine part, the full range displacement time, also always begins with this same position of the moving machine part. The spreading of the length of the relatively long control commencement build-up time is eliminated in this manner. Spreading of the very much shorter full range displacement time is accordingly much less noticeable. In this way the tolerance range for the initial position, in which the moving machine part permits the processing cycle to start, can be placed with sufficient accuracy within the overlap distance, in which the slides acquire the difference in their velocities which is necessary for the transfer of the workpiece. The advancing of the start of the control commencement build-up time does not require great accuracy. A minimum advance is sufficient. A greater advancement automatically results in a longer blocking time, since the end of the blocking time is fixed. The full range displacement time can be considered, in a first approximation, as being independent of the operating speed. This means that the initial position, wherein the moving machine part permits the processing cycle to start, is at a greater distance from the full range displacement position at higher operating speeds than at low operating speeds. The difference between these distances yields approximately the aforementioned tolerance range, which should lie within the aforementioned overlap distance for proper operation of the slide drawing machine. The method according to the invention provides an improvement over the aforedescribed heretofore known methods, increasing their accuracy and making them usuable also at higher operating speeds.

In accordance with another aspect of the invention, there is provided an apparatus for performing the method of controlling with heightened accuracy a processing machine driven at different operating speeds which, at an initial setting of a moving part thereof, within a tolerance range, repeatedly permits start-up of a processing cycle that has been instituted in advance through a given reaction delay time period wherein the moving machine part is a working member of the machine, and comprising track means for guiding the working member, control means for instituting actuation of the machine part at a position thereof wherein the actuation thereof is institutable; and blocking means engageable with the moving machine part for inhibiting full range displacement of the machine part that would otherwise result from the institution of the actuation thereof, the blocking means being active for inhibiting the full range displacement along a section of the track means up to a given position of the moving machine part within the displacement range thereof.

Other features which are considered as characteristic for the invention are set forth in the appended claims.

Although the invention is illustrated and described herein as embodied in a method and apparatus for controlling with increased accuracy a processing machine driven at varying operating speeds, such as a slide drawing machine, especially, as well as a slide drawing machine per se and auxiliary devices, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
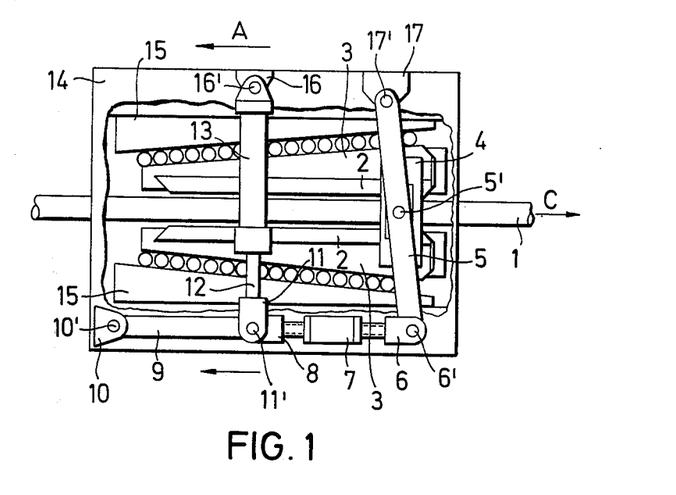
FIG. 1 is a diagrammatic view partly broken away of a drawing slide constructed in accordance with the invention, the drawing slide being in a reversed stroke displacement phase i.e. opposite to the operating direction, and the position of the control members thereof being such that the drawing jaws are not in engagement with the material being drawn, leaving clearance for non-engaging passage of the material.

Referring now to the drawing and first, particularly, to FIG. 1 thereof, there is shown a drawing slide constructed in accordance with the invention and in a phase of operation thereof wherein a toggle lever 6–9 is stretched straight out, and control members 11–13, drawing jaws 2 and movable wedges 3 are held rigid. The drawing slide is shown moving in direction of the arrow A, opposite to the direction of movement of the material 1 to be processed, as indicated by the arrow C.

In FIG. 1, a control cylinder 13 has pulled a piston rod 12 and a bearing yoke 11 by which it is secured to the toggle lever formed of conventional parts 6, 7 and 8 on the one side and of a part 9 on the other side, are stretched out straight. A bearing yoke 10 is firmly mounted on a drawing slide housing 14. The toggle lever arm 9 bears against the bearing yoke 19 through the pivot pin 10'. The bearing yoke 11 is connected with the toggle lever arms 9 and 8, 7, 6 through a pivot pin 11'. The toggle lever arm 6, 7, 8 which has an adjustable length, holds a lever 5 in swung-out position by means of a pivot pin 6'. The lever 5 is pivotally mounted at a bearing yoke 17 by means of a pin 17'. The bearing yoke 17 is firmly supported on the drawing slide housing 14. The control cylinder 13 is pivotally secured in a bearing yoke 16 by a pin 16', and the bearing yoke 16 is, in turn, mounted firmly on the drawing slide housing 14. Parts that are reciprocable in the drawing slide housing 14, such as the drawing jaws 2, the movable wedges 3 and an entrainer member 4 are held in rear position by the control linkage through a pivot pin 5'. The movable wedges 3 move parallel to the inclination of the wedges.

They bear against fixed wedge members 15 in the drawing slide housing 14 through trains of rollers, as shown in FIG. 1. The drawing jaws 2 are rigidly connected to the movable wedges 3 and, accordingly, follow the movement of the wedges 3. In the rear position of the drawing jaws 2 and the movable wedges 3, an air gap exists between the drawing jaws 2 and the material 1 in order to avoid contact therebetween.

Figure 2:
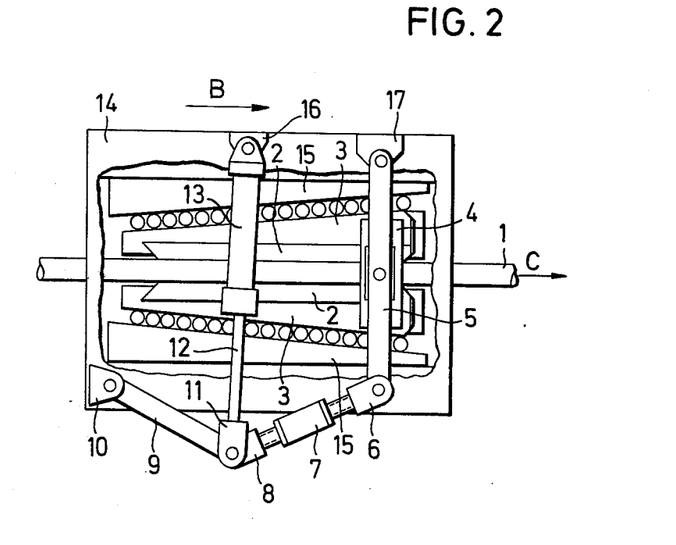
FIG. 2 is a view similar to FIG. 1 of the drawing slide of the invention shown in a phase wherein it is moving in the drawing direction i.e. together with the material in the operating direction, the control members being positioned so that the drawing jaws have gripped the material and are executing a drawing stroke.

In FIG. 2 the toggle lever 6–9 is bent outwardly, and a clamping force is thereby exerted through the control linkages and the wedges 3 and drawing jaws 2 on the material 1. In the phase position of FIG. 2, the drawing slide moves in the direction of the arrow B together with the material 1 in the direction of the arrow C. The drawing stroke is thereby executed. The required compressive force of the drawing jaws 2 applied to the material 1 is produced automatically by the wedging action between the movable wedges 3 and the fixed wedge members 15. The drawing jaws 2 press against the material 1, gripping it with a strong compressive force, and pull it with the drawing slide in the drawing direction B. The control cylinder has driven the piston rod 12 and the bearing yoke 11 outwardly. The toggle lever arm 9 has swung about the pivot pin 10' in the fixed bearing yoke 10. The other toggle lever arm 6, 7, 8 has swung about the pivot pin 6'. The pin 11', which performs an arcuate movement, imparts a swinging motion about the pivot pin 16' to the piston rod 12 and the control cylinder 13, so that the control cylinder 13, depending upon the adjustment of the control linkage, follows every movement. Through the bending of the toggle lever, the distance between the pin 10' and the fixed bearing yoke 10, on the one hand, and the pin 6', on the other hand, is shortened. The lever 5 pivots about the pin 17' in the fixed bearing yoke 17, in a direction opposite to the direction of travel of the drawing slide shown by the arrow B, and thereby moves the entrainer member 4, the movable wedges 3 and the drawing jaws through the pin 5' farther into the fixed wedge housing formed of the wedge pieces 15. Accordingly, the drawing jaws 2 are pressed against the material 1. The engagement surfaces of the drawing jaws 2 effect a longitudinal displacement opposed to the travel direction of the material 1, and simultaneously effect a displacement in traverse direction toward the material 1. Thus the control operation for closing the drawing jaws 2 is completed, and the drawing stroke can follow.

In FIGS. 3 to 6, the individual phase positions of the drawing slide during the control operation for closing the drawing jaws 2 are shown.

Figure 3:
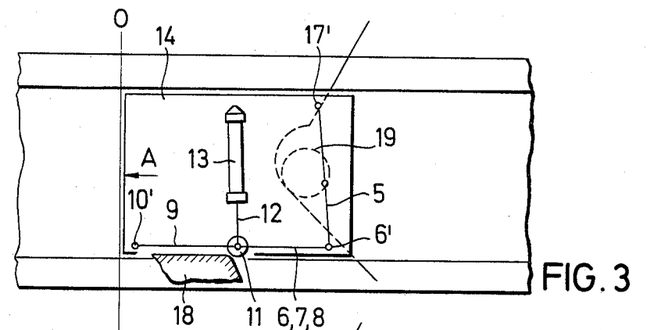
FIGS. 3 to 6 are diagrammatic views of the drawings slide on a smaller scale than in FIGS. 1 and 2, showing individual control phases thereof with respect to the position and direction of displacement of the drawing slide.

In FIG. 3, the drawing slide 14 moves in the direction of the arrow A with the drawing jaws open, as shown in FIG. 1. The bearing yoke 11 is retracted and the toggle lever 6–9 is in stretched-straight position. Shortly before the drawing slide reaches the reversal point i.e. just before it reaches the zero line, a control pulse is given to the control cylinder. Before the piston rod 12 together with the bearing yoke 11 is driven out of the control cylinder 13, a given time period elapses, a so-called control commencement build-up time. On the return path in direction A, the piston rod 12 with the bearing yoke 11 already extends outwardly somewhat, so that the bearing yoke 11 strikes against the parallel-disposed blocking bar 18 during the further return movement. As long as this blocking persists (blocking time), the piston rod 12 cannot be driven further outwardly. The pressure exerted on the piston within the control cylinder 13 therefore persists, although the piston is unable to complete the remainder of its stroke or travel path, i.e. full-range displacement.

Figure 4:
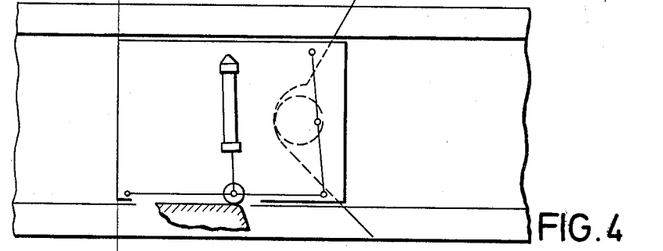

In FIG. 4 the drawing slide 14 has reached the reversal point. The leading edge of the drawing slide 14 is at the zero line. The bearing yoke 11 engages the parallel-extending blocking bar 18 under pressure. The control members cannot close the drawing jaws 2 as long as the bearing yoke 11 abuts the blocking bar 18.

Figure 5:
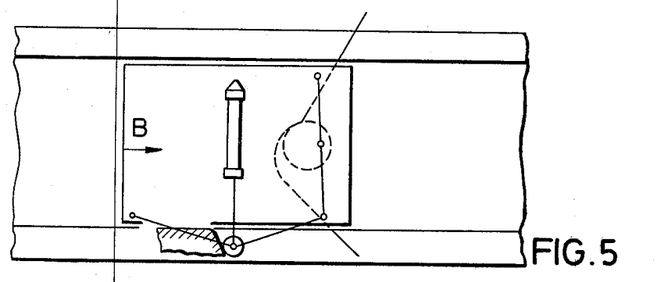

In FIG. 5, the drawing slide 14 moves away from the reversal point i.e. forward from the zero line in the direction of the arrow B. The drawing slide 14 is then being accelerated in the direction of the arrow B. The bearing yoke 11 presses against the parallel blocking bar 18 until the drawing slide reaches a position wherein the overlap section D in FIG. 7 begins. At that instant, the blocking ceases, and the remaining stroke or outward travel of the piston is resumed. The closing operation follows immediately, as shown in FIG. 2. Through this control operation, the time from switch-on to the application of pressure by the control cylinder i.e. the so-called control commencement build-up time, is rendered ineffective with respect to the control operation.

Figure 6:
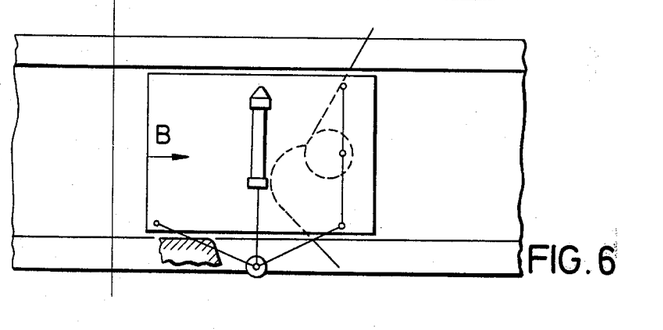
Figure 7:
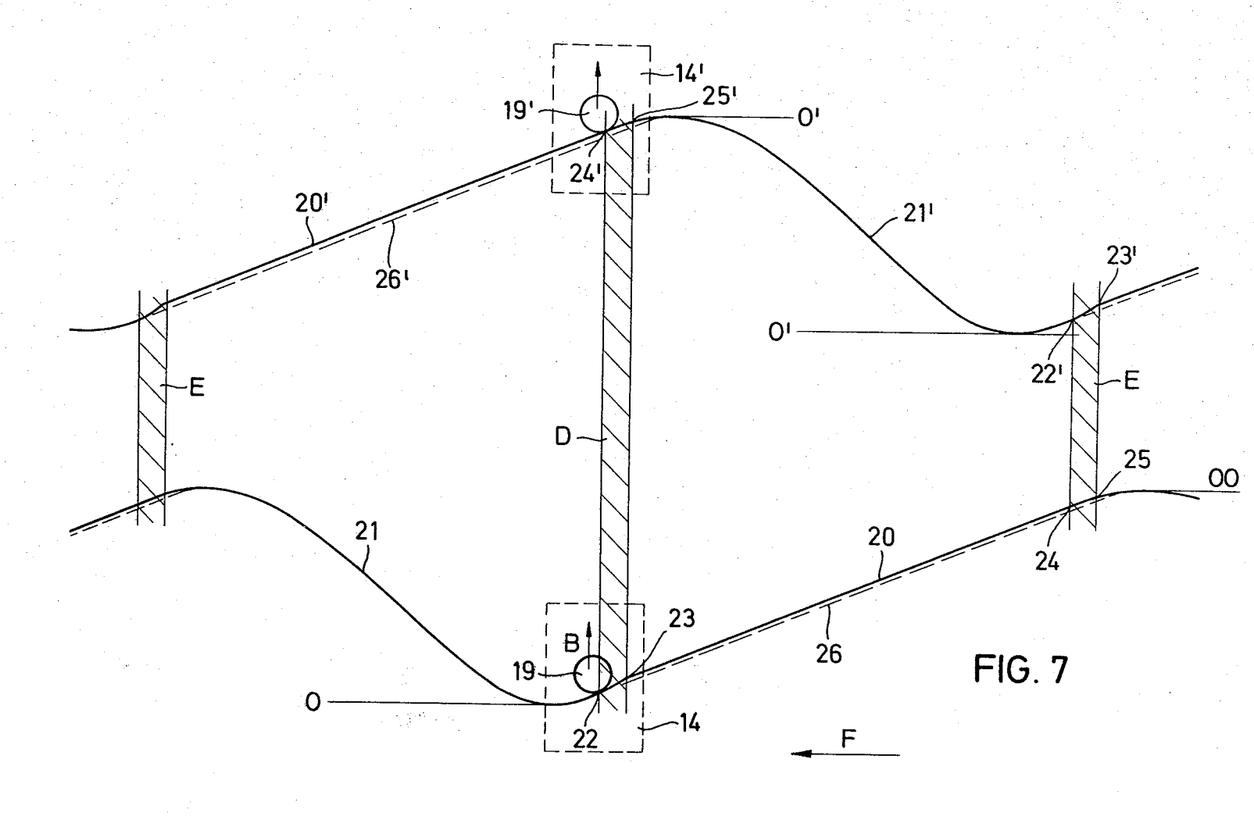
FIG. 7 is a plot diagram of the course or path of the cam profiles of the two drum-shaped cam carriers for the drawing slide with overlap sections.

In FIG. 6, the drawing slide 14 moves in the direction B and has already executed the drawing stroke (operating stroke). The overlap section D in FIG. 7 has thereby been passed through. In this section D, the drawing slide 14 takes over the material 1 from a drawing slide 14'. After the drawing slide 14 has completed its drawing stroke, the control operation, as described hereinbefore with respect to the drawing slide 14', is carried out. The subsequent repeated closing operation for the drawing slide 14' occurs in the overlap section E (FIG. 7). Therein, the material 1 is again taken over by the drawing slide 14' from the drawing slide 14.

The track of a cam surface of the drum-shaped cam carrier is shown in FIG. 7. In order to produce a continuous material drawing speed, at least two drawing slides are necessary. Each drawing slide is reciprocated by its own drive cam drum. The movements of the two drawing slides must be matched exactly to each other. The cam paths or tracks 20 and 20' are the forward tracks for the work stroke (drawing stroke). The cam tracks 21 and 21' are return tracks. At the reversal points 0 and 0', the direction of movement of the drawing slides in the direction B begins for a new work stroke. From the reversal point 0, a roller 19 at the slide 14 is advanced in the direction of the arrows B, when the cam drum rotates in the direction of the arrow F. Upon reaching the point 22 on the curve, the drawing slide 14 has attained the drawing speed. Within the overlap section D from the point 22 to the point 23 of the cam track, the closing operation of the drawing jaws occurs. In this overlap section D between the two points 22 and 23, the drawing slide is given an additional acceleration of the forward motion, so that the velocity thereof is somewhat higher, about 2 to 3% higher, than the work or drawing velocity.

By increasing the forward velocity within the overlap range, as was determined by suitable testing, the closing of the drawing jaws and the securing wedging action in the wedge housing of the drawing slide occur without any reduction of the workpiece velocity. Heretofore, this closing operation for the securing wedging action in the wedge housing of the drawing slide was performed only at the end of the overlap section and, in fact, in such a manner that the forward velocity of the material-transferring drawing slide 14' was decelerated after it reached the point 25'. This resulted in a reduction in the drawing velocity of about 2 to 3%.

Figure 8:
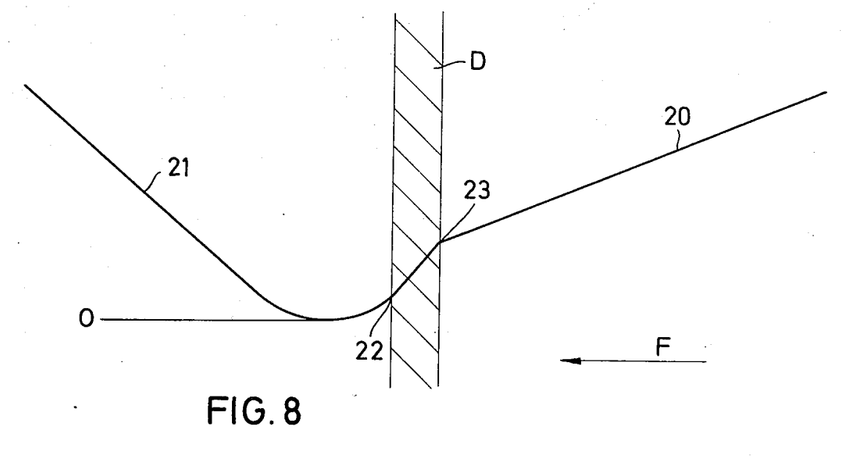
FIG. 8 is an enlarged fragmentary view of FIG. 7 showing a section of increased acceleration or velocity within one of the overlap sections.
Figure 9:
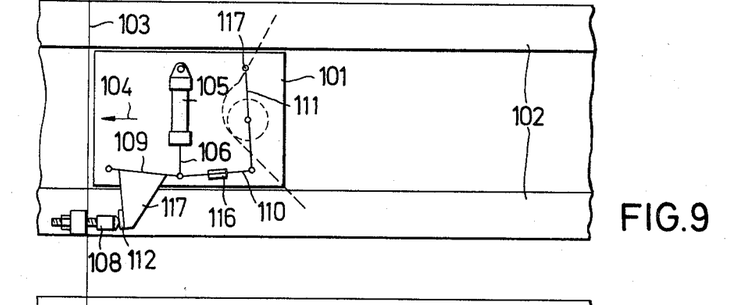
FIGS. 9 to 12 are diagrammatic views of another embodiment of the invention shown in various phases of operation.

In FIG. 8, the section of increased acceleration between the points 22 and 23 is shown in a somewhat exaggerated presentation.

FIGS. 9 to 12 show different operating positions of the drawing slide and the control device therefor. As viewed in FIG. 9, the slide 101 which is on slide tracks or rails 102 and has a direction of travel represented by an arrow 104 is located, at the instant shown in the figure, just ahead of the dead center point 103. At this instant, pressure medium can be admitted to the cylinder 105, but the piston rod 106 cannot yet be thrust outwardly, because a blocking lever 107 abuts an end stop 108. Blocking occurs through the toggle lever linkage 109, 110. The toggle lever linkage 109, 110 also serves to transmit the movement of the piston rod 106 to a linkage lever 111 pivoted at 117, through which the closing of the drawing jaws (not shown) is accomplished when the piston rod 106 is thrust outwardly. The length of the toggle lever 110 is adjustable by a connecting adjustment member 116, and the position of the end stop 108 is adjustable for its part in a conventional manner.

Figure 10:
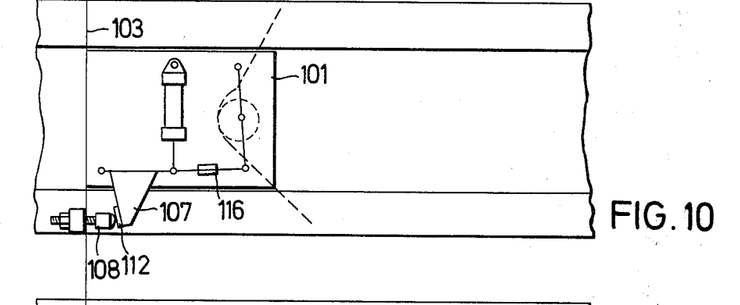

As shown in FIG. 10, the drawing slide 101 has reached dead center 103. The cylinder 105, acted upon by pressure medium, is blocked, as in FIG. 9, with respect to extending or thrusting outwardly the piston rod 106. In the phase positions depicted in both FIGS. 9 and 10, the drawing jaws 2 (FIG. 1) are not yet closed.

Figure 11:
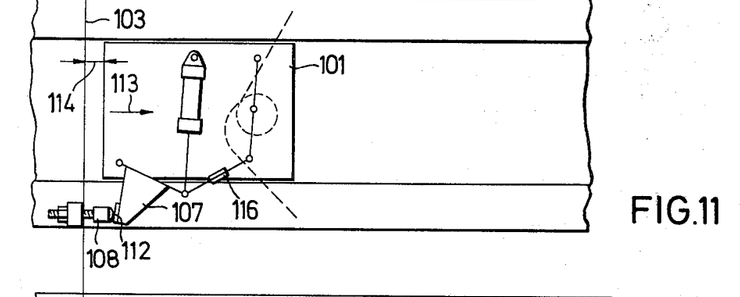

With respect to the phase illustrated in FIG. 11, the slide 101 has a travel direction as indicated by the arrow 113. The engaging surface 112 of the blocking lever 107 is beginning to lift from the end stop 108. The closing point of the drawing jaws is set at the spacing 114 of the slide 101 from the dead center 103 by suitably adjusting the adjustment member 116 of the toggle lever 110.

Figure 12:
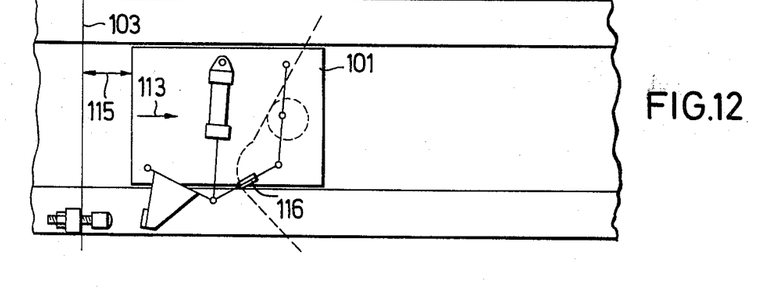
Figure 13:
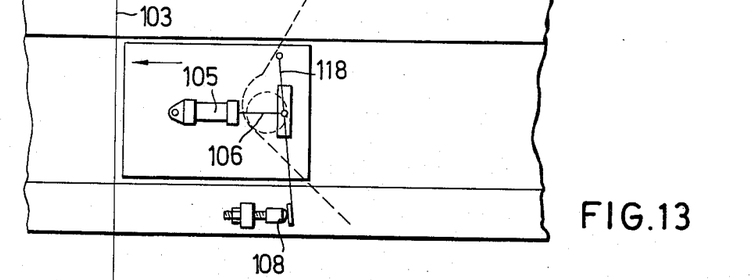
FIGS. 13 to 16 are diagrammatic views of yet another embodiment of the invention in different phases of operation.
Figure 14:
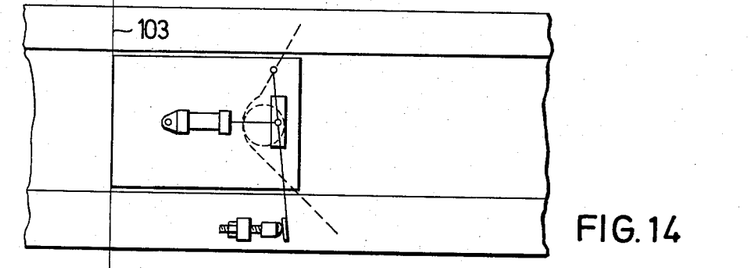
Figure 15:
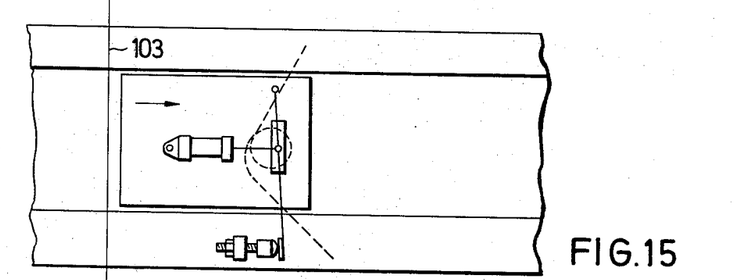
Figure 16:
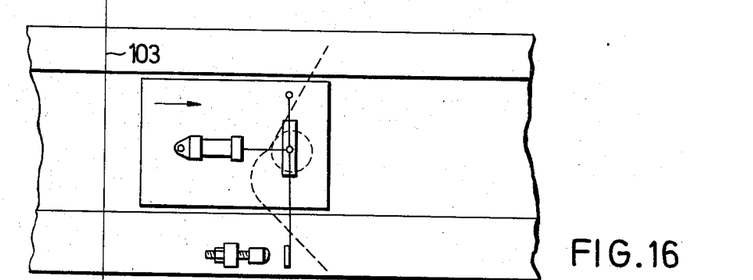
Figure 17:
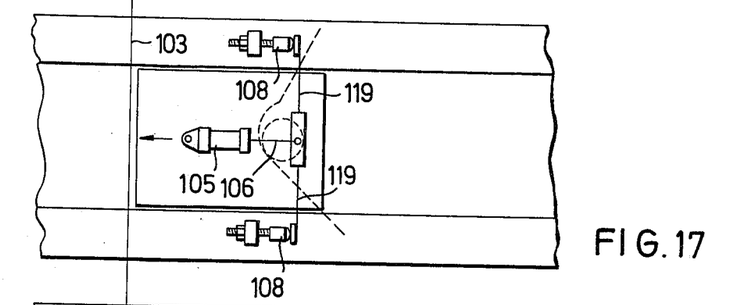
FIGS. 17 to 20 are diagrammatic views of a further embodiment in different phases of operation.
Figure 18:
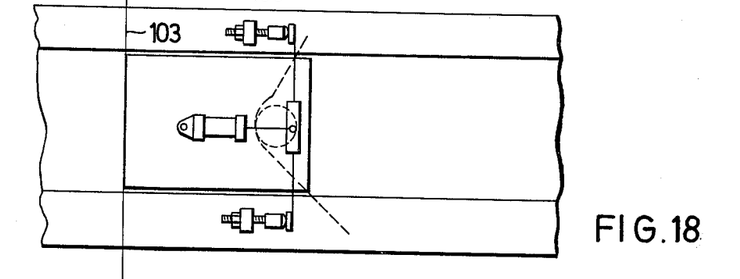
Figure 19:
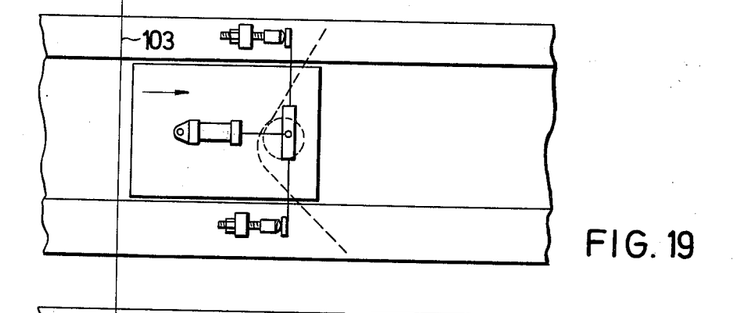
Figure 20:
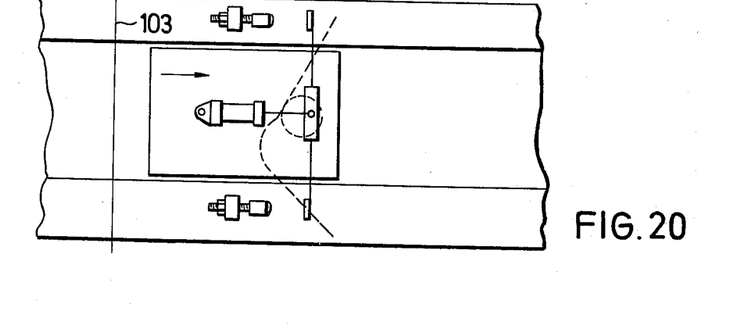

As shown in FIG. 12, the displacement of the slide 101 continues in direction of the arrow 113. The drawing jaws remain closed through the linkage lever 111, as the spacing 114 is enlarged to the spacing 115.

The basic function of the device shown in FIGS. 13 to 16 is the same as that of the device of FIGS. 9 to 12. However, in FIGS. 13 to 16, cylinder 105 and the piston rod 106 extend in the same direction as the slide tracks. Furthermore, in the embodiment of FIGS. 13 to 16, the piston rod 106 must be drawn inwardly to close the drawing jaws. The blocking lever and the linkage lever of the embodiment of FIG. 13 to 16 are furthermore, identical therein and form a single lever 118. The end stop 108, as in FIGS. 9 to 12, is adjustable in the embodiment of FIGS. 13 to 16. The blocking lever 118 is advantageously of resilient construction which increases the blocking period or range.

In the embodiment of FIGS. 17 to 20, also, the linkage lever and the blocking lever are identical and together form a common lever 119. The lever 119 extends on both sides of and transversely to the slide track direction and cooperates with two end stops 108. In this embodiment, also, the lever 119 may advantageously be of resilient construction so as to increase the blocking period or range.

In the embodiment of FIGS. 21 to 25, a bipartite carriage or severing slide assembly is formed of a lower severing slide 201 and an upper severing slide 202. The lower severing slide 201 is slidably mounted on a track 204, 205 in a machine frame and is movable in travel direction of the material being processed. The upper slide 202 is mounted on the lower slide 201 by means of roller bearings 203 and is movable back and forth relative to the lower slide 101 and parallel to the material travel direction. A severing tool 206 is mounted on the upper slide or carriage 202. Displacement of the upper slide 202 is effected by a displacement member 207, 208 which includes a small, separately driven hydraulic cylinder 207, having a total piston stroke length of about 50 mm. The hydraulic cylinder 207 is secured to the upper slide 202, and its piston rod 208 to the lower slide 201.

Figure 21:
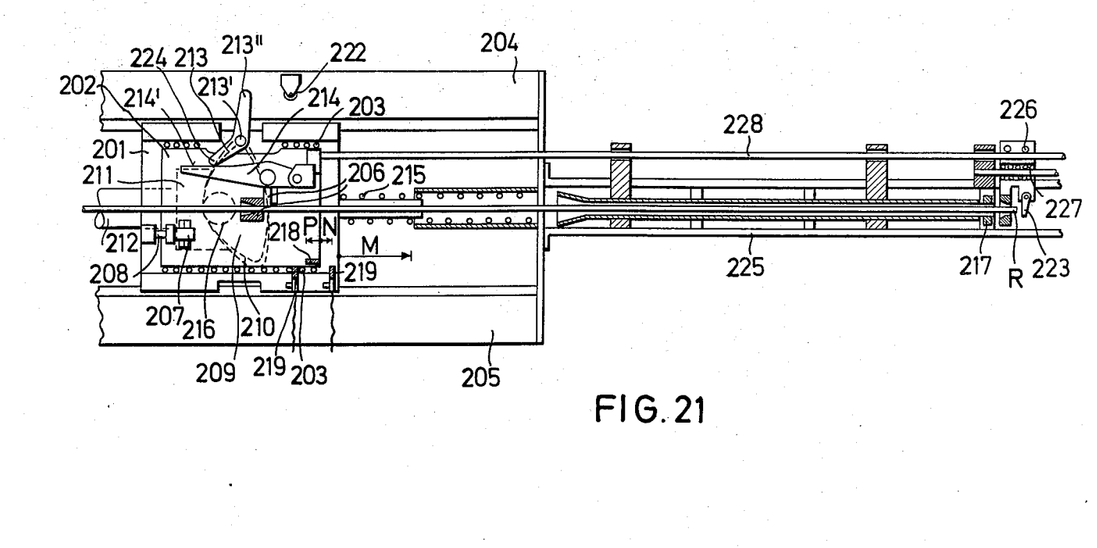
FIG. 21 is a diagrammatic view of a severing device constructed in accordance with the invention and shown in an initial or starting phase of operation.
Figure 22:
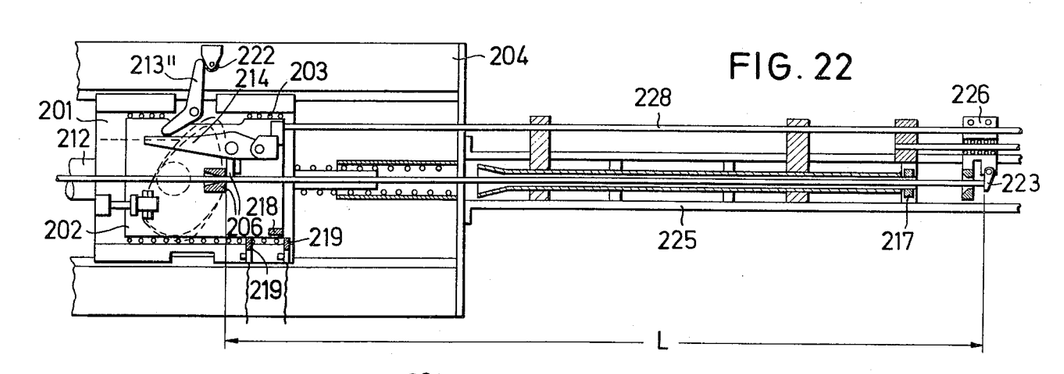
FIG. 22 is a view like that of FIG. 21 of the severing device with the severing location corrected with respect to the starting end of the material.
Figure 23:
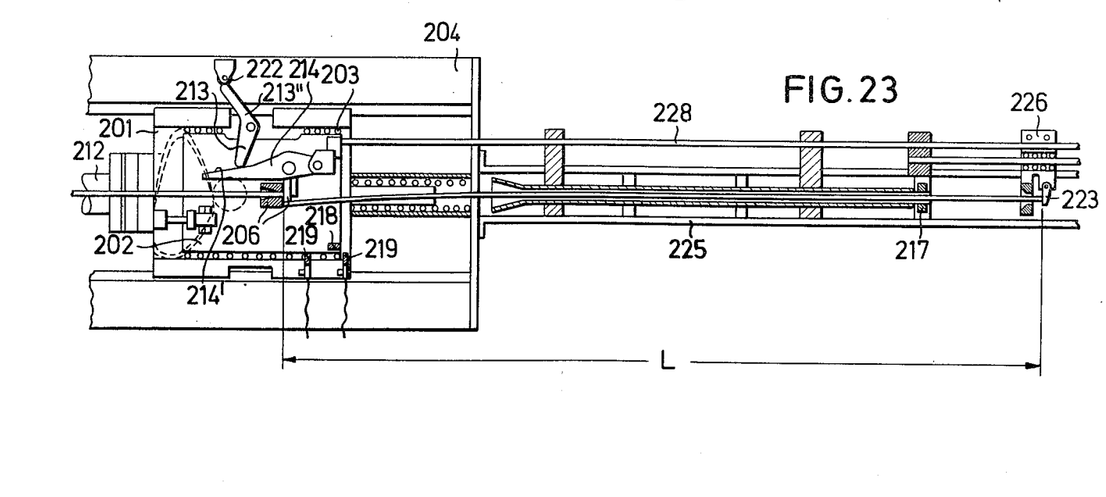
FIG. 23 is a view like FIGS. 21 and 22 of the severing device shown in a phase of operation after the strand of material has been severed.

The forward and return movement of the lower slide 201 with its upper slide 202 is effected by a drive cam 209, 210 (cam cylinder 209, cam track or profile 210). During one revolution of the cam cylinder 209, the entire severing slide assembly 201, 202 executes one reciprocating movement or one forward-and-return stroke. The course of the cam track or profile 210 is such that, during the rotation of the cam cylinder 209, the forward displacement or the forward velocity of the severing slide during the severing operation is equal to the operating velocity or the material feeding velocity. The cam cylinder or drum 209, during the severing operation, is connected to the main severing shaft 212 in motion-locked or force-locking manner through a controlled coupling (shifting clutch) 211. The main severing shaft 212 is connected through non-illustrated intermediate gearing with a non-illustrated production machine, and the revolution of the main severing shaft 212 always maintain a matched or coordinated relationship with the material feed velocity because of the precision or accuracy of the operation. No special auxiliary control devices or auxiliary controllable drive systems are required for this purpose. Thus, synchronous operation is assured during the severing operation.

Figure 24:
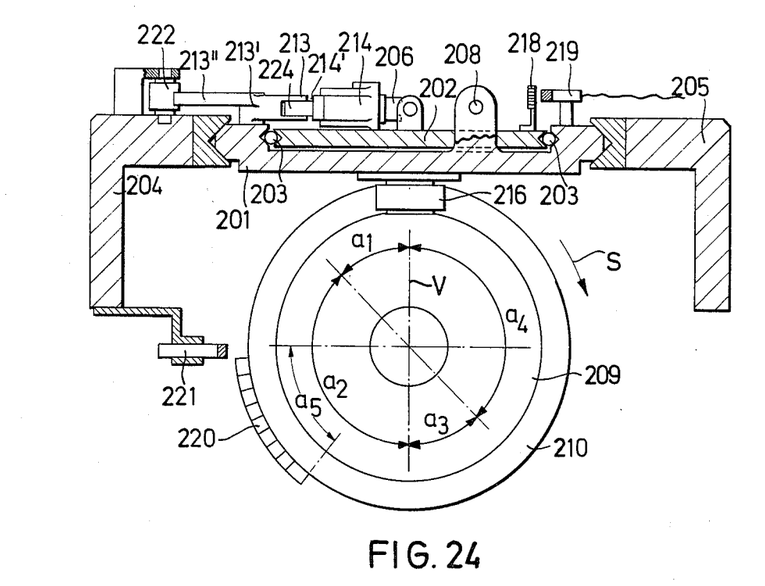
FIG. 24 is an enlarged cross-sectional view of the bi-partite slide of FIGS. 21 to 23.

The forward travel in direction of the arrow M (FIG. 21) of the lower slide 201 is composed of the acceleration distance $a_1$, the synchronous distance $a_2$ and the deceleration or slow-down distance $a_3$ (FIG. 24). During the travel of the lower carriage 201 along the synchronous stretch $a_2$, exact positioning of the cutting tool 206 or the cutting location relative to the starting end R of the material is performed i.e. adjustment of the length L, as shown for example in FIG. 22. The upper slide 202 is accordingly displaced relative to the lower slide 201 in the direction of the arrow N or P, depending upon a signal transmitted by a control finger 223. The positioning operation is performed in at most 80 ms (milliseconds), so that there is no longer any relative motion between the two slides 201 and 202 before the severing or cutting operation is initiated by the further forward travel of the severing slides 201 and 202.

The severing movement of the severing tool 206 is effected by the forward motion of the entire severing slide assembly 201, 202 through a lever system 213 and 214. The required severing or cutting force is also transmitted by this motion (in direction of the arrow M) of the severing slide assembly 201, 202. The direction of the force is accordingly changed in such a way that a residual force component in the adjustment direction N or P of the upper slide 202 is so small that it can be ignored. The angle lever or bellcrank 213 is pivotally mounted at a pivot point 213' on the lower slide 201. The arm 213' of the bell crank 213 strikes against a roller 222 secured to the rail 204, and at the same time the other arm of the bell crank 213 presses against the surface 214' of the knife-lever 214 through a roller 224. The disposition of the surface 214' is substantially parallel to the travel direction of the upper slide 202. After the severing operation is completed, the residual distance $a_2$ for the synchronous travel and the deceleration distance $a_3$ are traversed as the forward distance M. The severing slides 201 and 202 reach the rest position at the point V (FIG. 24) through the return distance $a_4$ at increased return speed. By means of a compression spring 215, the lower severing slide 201 is always pressed through a guide roller 216, against the cam track or profile 210 of the cam drum or cylinder 209 and is then returned to the rest position V thereof. Shortly before reaching the rest position at the point V, the cylinder or drum cam 209 is separated from the main separator shaft 212 by releasing the shifting clutch 211 and is held by a non-illustrated holding device, in the starting position V thereof, until a new command initiates the next severing operation.

Figure 25:
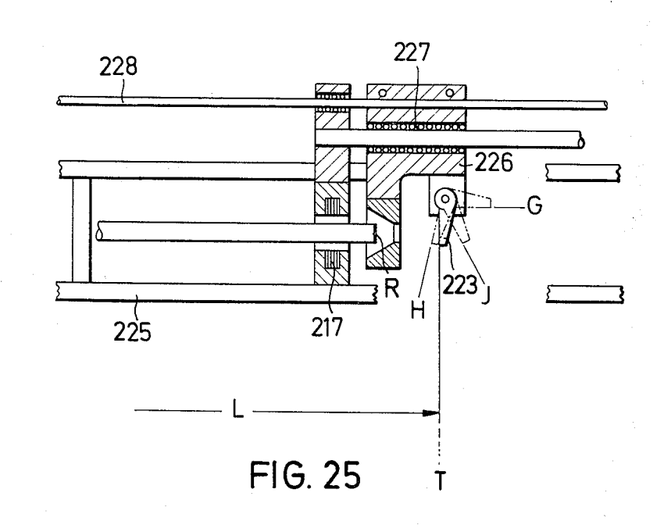
FIG. 25 is a fragmentary enlarged sectional view of the righthand side of FIGS. 21 to 23 showing the release contact and the control finger of the device.

To set or adjust the severing length L (FIG. 22, for example) a release contact 217 and the control finger 223 are adjusted in accordance with the spacing from the severing location required therefor. The release contact 217 is fastened to the lower frame 225, while the control finger 223 remains readily movable through a ball-bearing guide 227 parallel to the material travel direction represented by the arrow M. The holder 226 of the control finger 223 is supported by a ball-bearing guide 227 and is clamped to a distance rod 228. The distance rod 228 is, in turn, fastened to the upper slide 202. As soon as the upper slide 202 is moved, the distance between the holder 226 of the control finger 223 and the release contact 217 also forcibly changes. If the control finger 223 is disposed perpendicularly to the axis of the material, the nominal severing location is reached, and assurance of an exact length L of the material is thereby given.

In detail, the following timing sequence of the control process for the positioning of the severing location 206 with respect to the starting end R of the material is produced.

The starting end R of the material, when traveling through the release contact 217 (pickup probe ring 217), releases the command to sever, through a conventional speed-dependent time delay. In addition to the speed-dependent time delay, a variable delay is also provided. This auxiliary time delay is adjustable, selectively manually or automatically through an adjusting or servo-motor. Statistical evaluation of test series has shown that normal length tolerances within a given order of magnitude are always present, which must be correlated with an estimated or nominal range. In addition, longer-term deviations, for example, due to temperature effects or influences or wear of the clutch laminations, may necessiate readjustment. This readjustment is effected if the lower limit P or the upper limit N is approached (not FIG. 21). For this purpose, a switching vane 218 is disposed on the upper slide 202 and two contactless pickup probes 219 (not FIGS. 21 and 24) on the lower slide 201. As soon as these range limits are approached, the time delay is suitably changed through the adjusting motor. If the lower limit at P is approached, the time delay is increased, and at the upper limit N, is decreased. Through this additional delay, exact equalization or balancing of length deviations is attained even for an extended period of operation of the machine.

The control device and the command equipment for the servo-positioning are normally not in operation, i.e. when the cylinder cam 209 is in the zero position V. Only after the command for severing is given, is the cylinder or drum cam 209 form-lockingly or positively coupled through the shifting clutch 211 with the main severing shaft 212. The rotary motion of the cam in the direction of the arrow S is thereby initiated. The switching vane 220 secured to the cylinder cam 209 releases or frees the blocked operation of the control device when the vane 220 passes the contactless pickup probe 221. The length of the switching vane 220 or the duration of operation of the control device is such that the acceleration distance $a_1$ and a short part of the synchronous distance $a_2$ are contained therein. The length limit $a_5$ of the switching vane 220 is dimensioned so that the forward travel of the slides 201 and 202 in the direction of the arrow M proceeds so far that the angle lever 213 or bell crank abuts against the roller 222, and the knife or blade 206 has reached the severing position. Within the overlap distance $a_5$ of the switching vane 220, the positioning is performed through conventional regulating and control devices, such as hydraulically, for example. After the switching vane 220 has left the contactless probe 221, the severing operation occurs through the further forward movement of the slides 201 and 202 in the direction of the arrow M. Simultaneously, the control device is blocked. The assumed location or position of the severing point, i.e. the position of the upper slide 202 relative to the lower slide 201, is maintained until the new command is given for the next severing operation.

The control finger 223 for ascertaining the required rod length L actuates a conventional electronic angle transmitter or transducer. The latter delivers a voltage proportional to the angle of rotation, which corresponds to a given control velocity for forward and return control through a servo-amplifier after the control device is set in operation. When the control finger 223 has reached the nominal position T, the positioning or control speed is equal to zero, and the correct position of the severing device 206 has thereby been attained. At the nominal position T, no control voltage is delivered by the rotary transducer or transmitter. After the severing operation has been completed, the control finger 223 is swung outwardly by an electromagnet to the position G shown in phantom which permits unhampered passage of the rod material. Since the servo-operation is blocked, no control voltage is fed to the servo-amplifier either. The control finger 223 is released by the electromagnet to swing back to the normal position H thereof only if the starting end R of the material passes through the ring pickup probe 217 (release contact) and a new switching cycle is triggered.

All of the features that are disclosed in the foregoing description and/or are shown in the drawing should, insofar as the heretofore known state of the art permits, be considered by themselves or in any combinations or partial combinations as being within the scope of the invention, even if not specifically defined in the claims.

There is claimed:

1. Method of controlling with heightened accuracy a processing machine driven at different operating speeds, the processing machine having machine tool means displaceable over a given full range and a machine part moving in synchronism with a cycle of the process that has been instituted in advance through a precontrolled time period dependent upon the operating speed and which includes a control commencement build-up time and a time period for the full-range displacement of the machine tool means, and, at an initial setting of the moving machine part, within a given tolerance range permitting start-up of said processing cycle, which comprises interposing a blocking time period between the control commencement build-up time period and the full-range displacement time period, the blocking time period always ending at an instant at which the moving machine part is at the same position in the displacement range thereof, blocking the full-range displacement of the machine tool means until the end of the blocking time period, and advancing the start of the control commencement build-up time period in accordance with the blocking time period.

2. Method according to claim 1 which further comprises effecting a part of the full-range displacement of the machine tool means during the blocking time period until shortly before a workpiece is engaged by the machine tool means for processing by the machine so as to leave only a residual distance for completing the full range displacement of the machine tool means.

3. Apparatus for performing a method of controlling with heightened accuracy a processing machine driven at different operating speeds, which, at an intitial setting of a moving part thereof, within a tolerance range, repeatedly permits start-up of a processing cycle that has been instituted in advance through a given reaction delay time period wherein the moving machine part is a working member of the machine, and comprising track means for guiding said moving machine part, means for instituting actuation of said machine part at a position thereof wherein the actuation thereof is institutable, machine tool means displaceable over a given full range and blocking means engageable with said moving machine part for inhibiting full-range displacement of said machine tool means that would otherwise result from said institution of the actuation of said machine part, said blocking means being active for inhibiting said full range displacement along a section of said track means up to a given position of said machine tool means within said displacement range thereof.

4. Apparatus according to claim 3 wherein said blocking means comprises a blocking bar extending along the respective section of said track means.

5. Apparatus according to claim 3 wherein the processing machine is a slide drawing machine wherein said track means extend parallel to the operating direction of the machine and wherein two alternatingly operating slides are reciprocatingly movable on said track means, rotating cam carriers associated with said slides for driving the same, openable and closable drawing jaw means on each of and slides, said control means controllably actuating said drawing jaws repeatedly within an overlap distance traversible by one of said slides during transfer of a workpiece from one to the other of said slides, and displacing the phase of cam tracks on said cam carriers which produces, within said overlap distance, a difference in velocity of said slides that is necessary for effecting transfer of the workpiece, said cam tracks in a starting region of a work stroke portion of the slide drawing machine located within said overlap distance have a steeper slope than in the remaining region of said work stroke portion.

6. Apparatus according to claim 5 wherein the slope of said cam tracks in said starting region is about 1 to 5% steeper than in said remaining region.

7. Apparatus according to claim 5 wherein said blocking means comprises a blocking bar extending along the respective section of said track means and ending at about the beginning of said overlap distance.

8. Apparatus according to claim 7 wherein said blocking bar is adjustable in longitudinal direction of said track means.

9. Apparatus according to claim 3 wherein the processing machine is a slide drawing machine wherein said track means extend parallel to the operating direction of the machine and wherein at least one slide is reciprocatingly movable on said track means, a rotating cam carrier associated with said slide for driving the same, drawing jaw means on said slide openable and closable in direction transverse to the operating direction of the machine, locking wedge means connected to said drawing jaw means and displaceable in direction parallel to the operating direction of the machine, and control means controllably displacing said locking wedge means between respective positions thereof wherein said drawing jaw means are released from and clamp a workpiece, said control means having a direction of action transverse to the operating direction of the machine, deflection members being interposed between said control means and said locking wedge means, and means for blocking movement of said locking wedge means in accordance with the respective position of said movement blocking means.

10. Apparatus according to claim 9 wherein said control means comprises a pressure medium-responsive member including a cylinder, a piston displaceable in said cylinder and having a piston rod extending transversely to the operating direction of the machine, one end of said pressure medium-response member being pivotally secured to said slide, said deflection members being comprised of a toggle lever linkage having a first toggle lever pivotally secured at an outer end thereof to a fixed bearing location on said slide and a second toggle lever having an outer end force-lockingly connected through an articulating joint with said locking wedge means, said first and second toggle levers having a common toggle joint articulatingly linked to the other end of said pressure medium-responsive member, both of said toggle levers, in released position of said locking wedge means, extending stretched out and substantially parallel to the operating direction of the machine.

11. Apparatus according to claim 10 wherein said force-locking connection of said outer end of said second toggle lever with said locking wedge means comprises a linkage lever disposed transversely to the operating direction of the machine, said linkage lever having one end pivotally secured to a fixed bearing location of said slide and another end articulating connected to said outer end of said second toggle lever, and including an entrainer member connected to said locking wedge means, said linkage lever being articulatingly connected, substantially at the middle thereof, to said entrainer member.

12. Apparatus according to claim 10 wherein one of said first and second toggle levers is adjustable in length.

13. Apparatus according to claim 9 wherein said displaceable locking wedge means comprise a pair of locking wedges located on opposite sides of said openable and closable drawing jaw means, said locking wedges having wedge surfaces facing away from said drawing jaw means and extending at an inclination to the operating direction of the machine, and including additional wedge members fixed to said slide and having respective wedge surfaces located opposite the wedge surfaces of said locking wedges, and roller means interposed between the opposing wedge surfaces of said locking wedges and said fixed wedge members for guiding said locking wedges.

14. Apparatus according to claim 9 wherein said blocking means are coordinated with said track means, and said control means comprises a pressure medium-responsive member cooperating with said blocking means so as to be displaceable at most over part of a full displacement range thereof along said section of said track means, said drawing jaw means being maintained in open condition during displacement of said pressure medium-responsive member over said part of said full displacement range.

* * * * *